April 7, 1925.

A. L. KNAPP

ROBE SUPPORT AND HANDLE

Filed April 21, 1923

1,532,320

Inventor

Archer L. Knapp

By

Attorney

Patented Apr. 7, 1925.

1,532,320

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

ROBE SUPPORT AND HANDLE.

Application filed April 21, 1923. Serial No. 633,601.

*To all whom it may concern:*

Be it known that I, ARCHER L. KNAPP, a citizen of the United States, and resident of Detroit, Wayne County, State of Michigan, have invented certain new and useful Improvements in Robe Supports and Handles, of which the following is a specification.

This invention relates to motor vehicles and particularly to the body or body fittings thereof, and it has for an object to provide a fitting which may be used by a passenger to facilitate his entry to and exit from the vehicle.

Another object is to provide such a fitting in combination with the robe hanger with which vehicles are frequently provided, and which is usually located on the back of the front seat of the vehicle.

Other objects and structural features of the invention will be apparent from the subjoined description, in connection with the accompanying drawing, in which—

Figure 1:
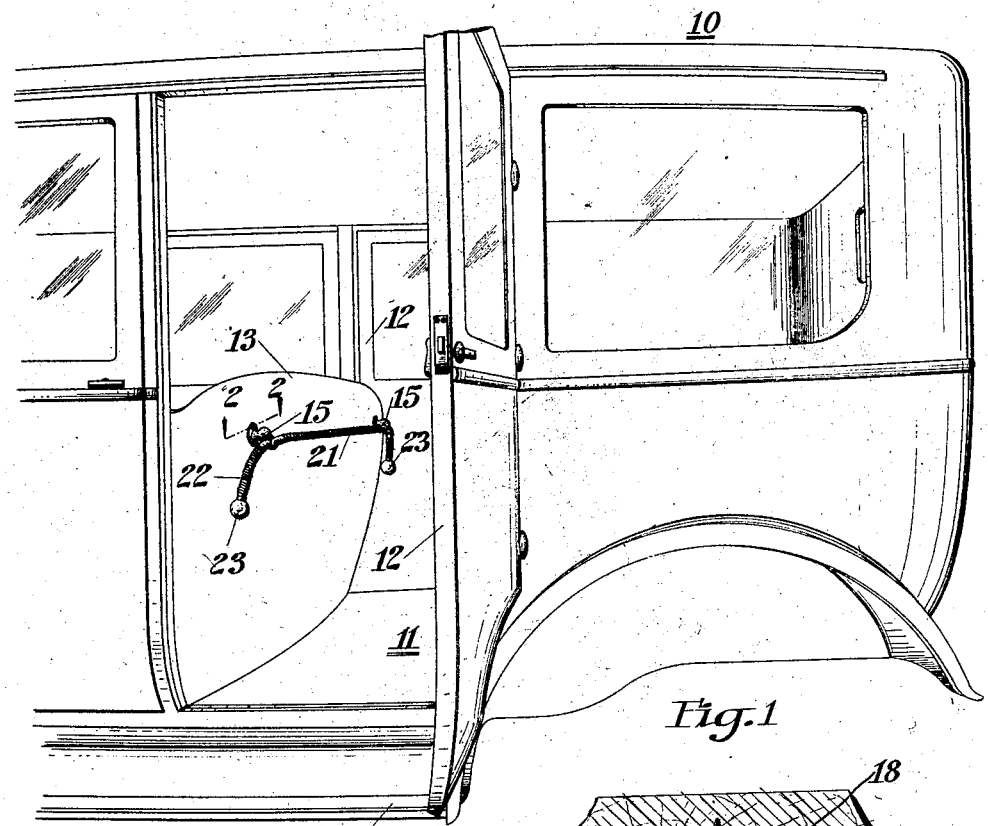
Figure 2:
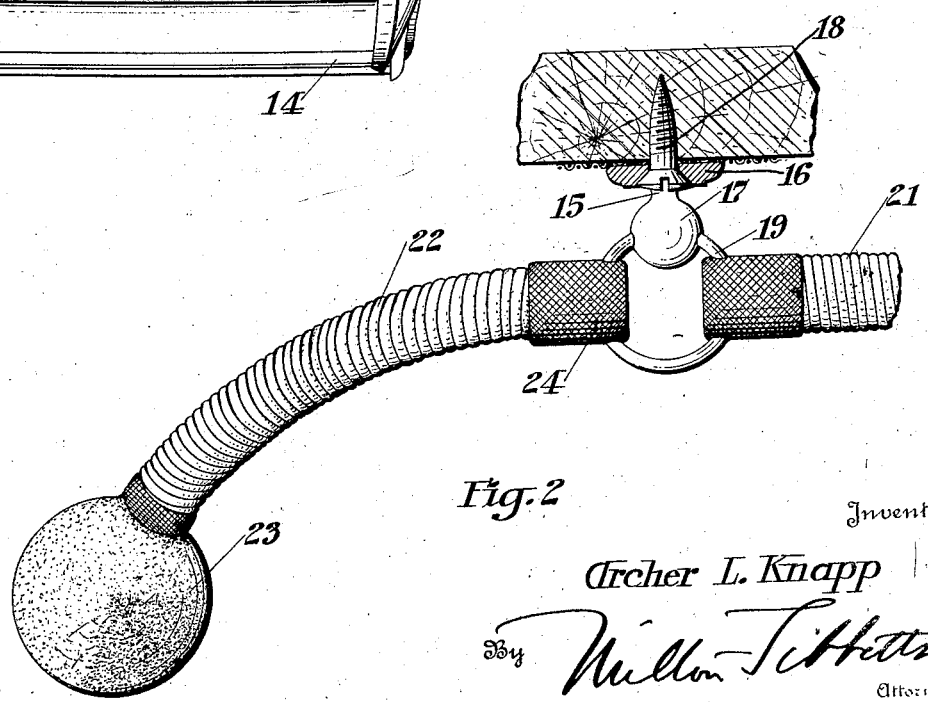

Fig. 1 is a perspective view of part of the body of a motor vehicle, showing the application of the invention thereto, and Fig. 2 is an enlarged section on the line 2—2 of Fig. 1.

Climbing into and out of a motor vehicle is a feat requiring a certain amount of agility and manual dexterity, particularly if the vehicle body is of the closed type. It is necessary to take a relatively high step from the ground to the running board, then to take another step to the vehicle floor, at the same time moving through a comparatively narrow doorway which is often partially obstructed by a projecting part of the back of the front seat. To aid in this maneuver the passenger usually grasps whatever object is most convenient by which he can steady himself and on which he can exert a pull. The top of the front seat, the door pillar, and, in the case of the open type of vehicle, the top of the door itself, are frequently used for this purpose. This practice is often detrimental to the part grasped, placing on it an unusual strain for which it was not designed, and is furthermore usually unsatisfactory to the passenger, the part grasped not being located conveniently for this purpose. This invention provides a fitting adapted to prevent injury to various parts of the vehicle body by presenting a grip or handle for easy use of the passenger in entering the vehicle.

In the drawing is shown a motor vehicle 10, having a rear compartment 11 provided with doors 12, and separated from the front or driving compartment by a seat 13. The vehicle 10 has the usual running board 14 to which the first step is made from the ground in the process of entering the vehicle. It is at this time or immediately thereafter, that the passenger usually seeks some object to grasp and pull against.

This invention provides a pair of brackets 15, to which the combined robe hanger and handle are attached. As shown, each of the brackets 15 has a flat base portion 16 to which is rigidly secured a projecting post portion 17. The base portion 16 is adapted to be secured to the vehicle body in any convenient manner, as by wood screws 18 passing through the base portion into the frame work of the back of the seat 13. Pivotally mounted in the post portion 17 of each of the supports 15 is a ring 19. Supported from the rings 19 is a flexible cable 21, adapted for the reception of lap robes, blankets, etc., in the usual manner. The cable 21 may be formed, as shown, of braided fabric or of leather but it is to be understood that this member may be made of any material suitable for the purpose.

Secured to each of the rings 19 is a short length of cable 22, preferably of material similar in size and construction to the cable 21, which forms the robe hanger. Rigidly secured to the end of this cable 22 is a knob or ball 23, forming a handle which may be readily grasped from a position outside the vehicle body and on which a pull may be exerted to assist the passenger on to the running board 14 and into the vehicle. The cable is attached to the ring 19 by a sliding connection 24 so that the cable may assume various angles in accordance with the line of pull exerted by the passenger in climbing into the vehicle.

It will be readily seen that by the use of the convenient handle the passenger is not dependent on the unsatisfactory expedient of taking a poor hold on the top of the seat 13, or in grasping the top of the door or the fittings thereon, to the detriment thereof. The brackets 15 are secured to the body with sufficient rigidity to receive any normal pull that may be exerted on the cable 22. At the same time they will take the load on the cable 21 caused by the hanging or robes, etc. thereon.

It will be understood that various forms of the invention other than those described above may be used without departing from the spirit or scope of the invention.

What is claimed is:

In combination with a robe supporting member for motor vehicle bodies, a bracket for said member, and a handle secured to said bracket including a flexible cable and a knob secured to the free end thereof.

In testimony whereof I affix my signature.

ARCHER L. KNAPP.